United States Patent [19]

Raidel

[11] 4,181,323

[45] Jan. 1, 1980

[54] AIR SPRING AND PARALLELOGRAM SUSPENSION

[76] Inventor: John E. Raidel, Rte. 9, Box 400-M, Springfield, Mo. 65804

[21] Appl. No.: 876,220

[22] Filed: Feb. 9, 1978

Related U.S. Application Data

[63] Continuation-in-part of Ser. No. 728,867, Oct. 1, 1976, Pat. No. 4,114,923.

[51] Int. Cl.$^2$ ............................................. B10K 23/00
[52] U.S. Cl. ................................................. 280/711
[58] Field of Search ............... 280/711, 702, 705, 709, 280/712, 713

[56] References Cited

U.S. PATENT DOCUMENTS

| | | | |
|---|---|---|---|
| 2,998,261 | 8/1961 | Bartlett | 280/771 |
| 3,410,575 | 11/1968 | Turnbull et al. | 280/711 |
| 3,828,881 | 8/1974 | Owen | 280/711 |

Primary Examiner—Richard A. Bertsch
Attorney, Agent, or Firm—Rogers, Eilers & Howell

[57] ABSTRACT

A suspension assembly having a unitized parallelogram structure with air springs for resiliently resisting movement of the axle upon loading and unloading. A hanger depends from the chassis of the vehicle and pivotally supports the forward ends of at least two torque beams or rods defining the parallelogram of the assembly. An axle seat is provided to which the axle of the vehicle is rigidly secured with the axle seat having a portion extending forwardly of the axle to which the rearward ends of the torque rods are pivotally mounted. The axle seat also has a portion extending rearwardly of the axle and air springs are mounted between the chassis and the forward and rearward extensions of the axle seat. The forward portion of the axle seat defines the pocket for receiving the rearward ends of the torque rods and the upper one of the rods is offset downwardly providing clearance from the axle seat. The rearward extension of the axle seat defines a compartment for housing an air brake cylinder of the vehicle. The assembly is adaptable to either single or tandem axles and to either drive or steer axles.

16 Claims, 10 Drawing Figures

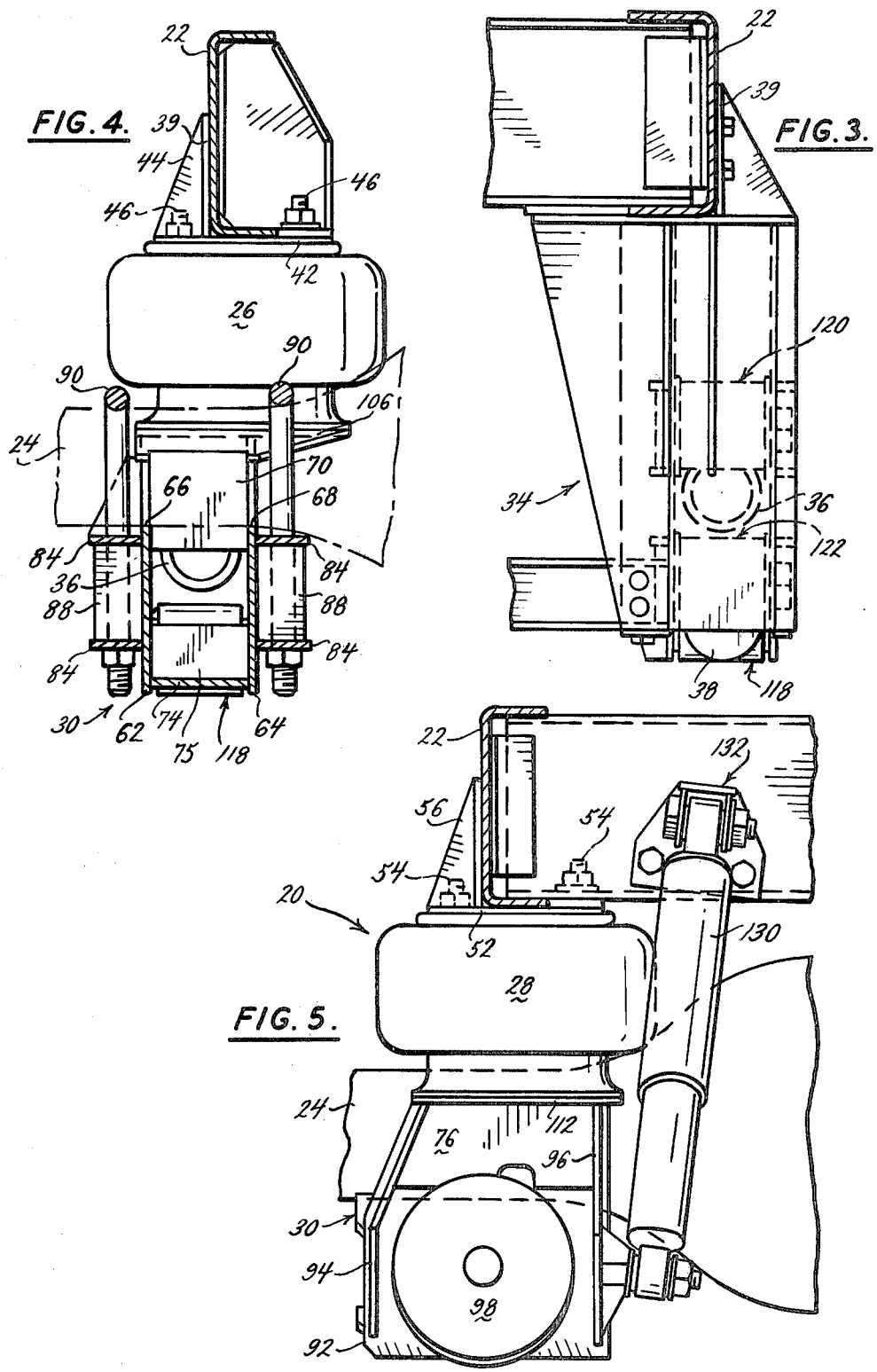

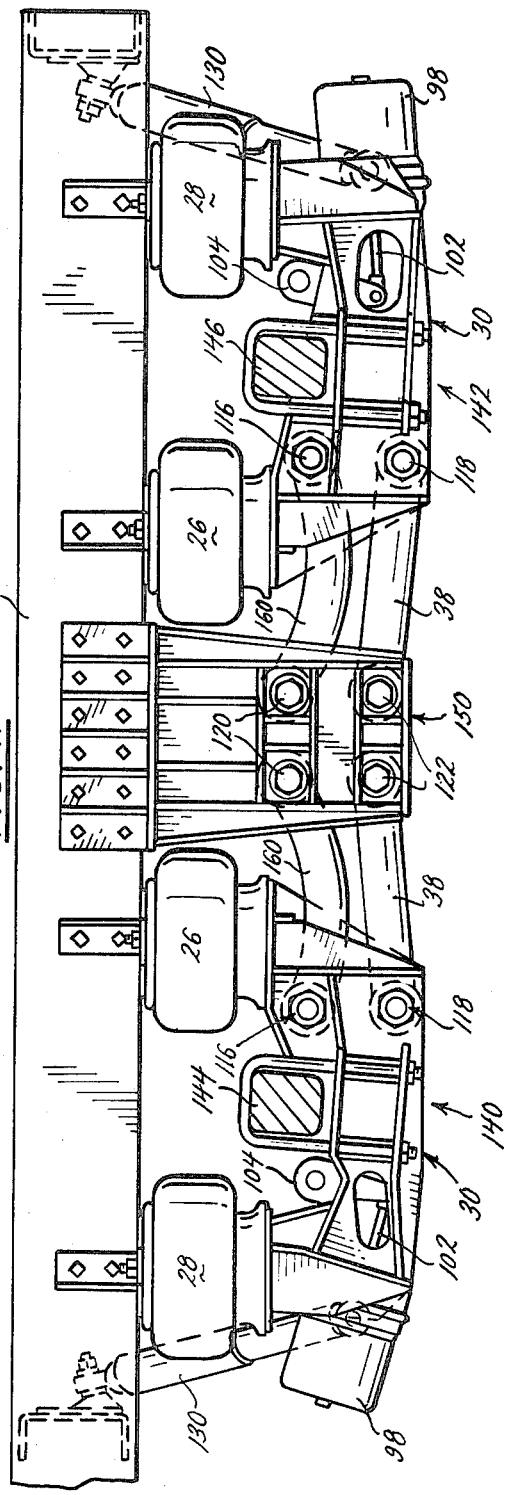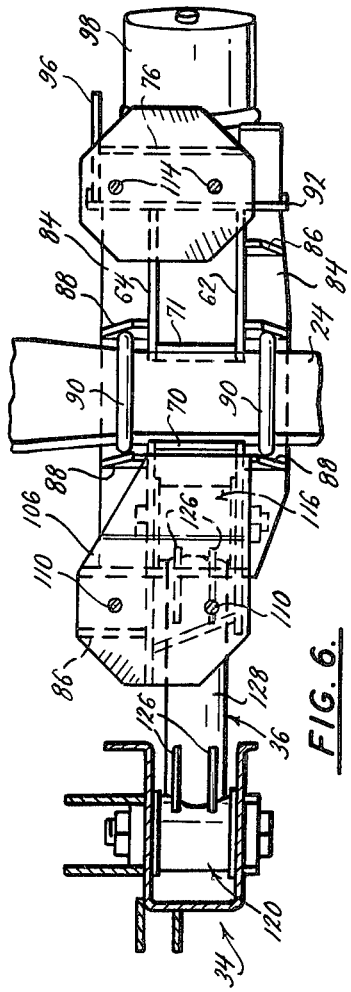

4,181,323

AIR SPRING AND PARALLELOGRAM SUSPENSION

SUMMARY AND BACKGROUND OF THE INVENTION

This application is a continuation-in-part of patent application, Ser. No. 728,867, filed Oct. 1, 1976 now U.S. Pat. No. 4,114,923.

This invention generally relates to a suspension assembly for a vehicle, and more specifically to one of an air spring type wherein the axle is completely resiliently supported by air springs located rearwardly of a depending hanger and which combine with a parallelogram arrangement for maintaining the axle pitch constant during up and down movement of the axle. The suspension of this invention is particularly directed to one of a unitized structure wherein all of the operational components of the suspension are provided within the assembly itself without the need for components located elsewhere on the vehicle for proper operation. Thus, each of the suspension assemblies of this invention is self-contained, or unitized, such that the entire parallelogram arrangement is included therewith.

Parallelogram suspensions are known in the art, as are such suspensions which also utilize air springs located rearwardly of a depending hanger and mounted between an axle seat or beam or the like and the chassis for resiliently supporting the chassis on the axle. Such a suspension is shown in U.S. Pat. No. 2,970,848 to Rice. However, such suspensions have not been "unitized " in the sense that all of the operational components of the suspension are contained within each such suspension. Thus, in the parallelogram arrangement of prior art suspensions of this general type it has been customary to provide only one of the torque rods for the parallelogram arrangement with the suspension itself with the other of the rods in the parallelogram arrangement located midway of the axle. Thus, to install the suspensions of this general type of the prior art is was necessary to pivotally mount a separate torque rod beneath the vehicle between the chassis and the axle at an intermediate location of the axle as well as install the remaining operational components of the suspension at the end of the axle. The installation of such a torque rod at such an intermediate location is awkward and inconvenient as it is located beneath the vehicle and requires special provision for its mounting. It is also imprecise in that it is difficult for the installer to locate the pivot mounts of the rod beneath the vehicle so as to have the proper relationship with the rod located with the suspension at the end of the axle. This relationship is important for proper operation of the parallelogram. It is believed that the parallelogram arrangement of the prior art resulted from problems of space limitations in providing a unitized parallelogram arrangement, which problems have not heretofore been solved.

Applicant has solved these problems by providing a unitized parallelogram air spring suspension wherein all of the operational components are provided with the suspension and mounted at the end of the axle for greater precision and easy access and installation while maintaining a compact design resulting in greater stability.

Generally, the suspension of this invention includes a hanger depending from the vehicle chassis to which the forward ends of a pair of vertically spaced torque rods are pivotally mounted. A vehicle axle is rigidly secured to an axle seat having a portion extending forwardly of the axle seat but located rearwardly of the hanger and a portion extending rearwardly of the axle seat. Air springs are located rearwardly of the hanger and mounted between the chassis and the forward and rearward extensions of the axle seat for resiliently resisting axle movement upon loading and unloading of the axle. The forward portion of the axle seat defines a pocket in which the rearward ends of the torque rods are pivotally mounted, the upper torque rod being offset downwardly to provide clearance from the axle seat. In one embodiment of the invention the upper torque rod is curved downwardly to provide such offset and clearance and in another embodiment it is provided with a generally straight portion extending fore and aft with members pivotally mounted to the hanger and the forward extension of the axle seat and depending downwardly therefrom to the generally straight portion to provide the offset and clearance. In this way the entire parallelogram arrangement, including both torque rods, is unitized as a single assembly along with the other operational components of the suspension while still providing compactness in design. The rearward extension of the axle seat defines a compartment for housing an air brake cylinder of the vehicle so as to further maintain compactness with full utilization of space.

In this way, the unitized suspension assembly of this invention is particularly unique in its adaptation to the structure of the vehicle itself and other components of the vehicle such as the air brakes, and is easily adapted for use with either drive or steer axles, and either single or tandem axles. Eccentric pivotal mounts are provided for the torque rods to provide means for axle alignment and axle pitch adjustment.

DESCRIPTION OF THE DRAWINGS

FIG. 3 is a view in section taken generally along the line 3—3 of FIG. 2;

FIG. 4 is a view in section taken generally along the line 4—4 of FIG. 2;

FIG. 5 is a view in section taken generally along the line 5—5 of FIG. 2;

FIG. 6 is a view in section taken generally along the line 6—6 of FIG. 2;

FIG. 7 is a side elevation view of another embodiment of the invention showing suspension assemblies of this invention for use on tandem axles;

DETAILED DESCRIPTION OF PREFERRED EMBODIMENTS

The Embodiment of FIGS. 1-6

Figure 1:
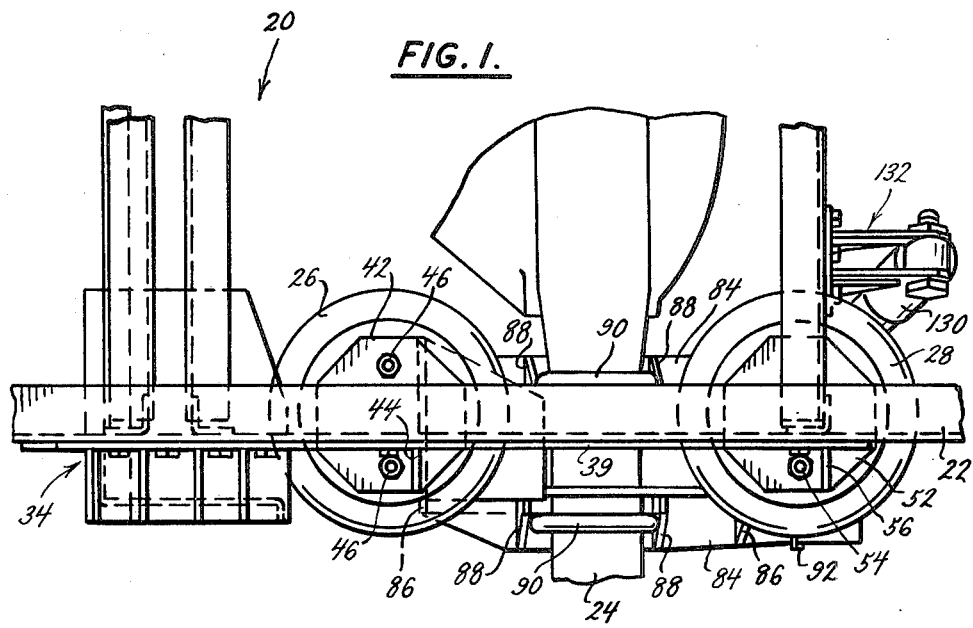
FIG. 1 is a plan view of a suspension assembly of this invention for use on a single axle.
Figure 2:
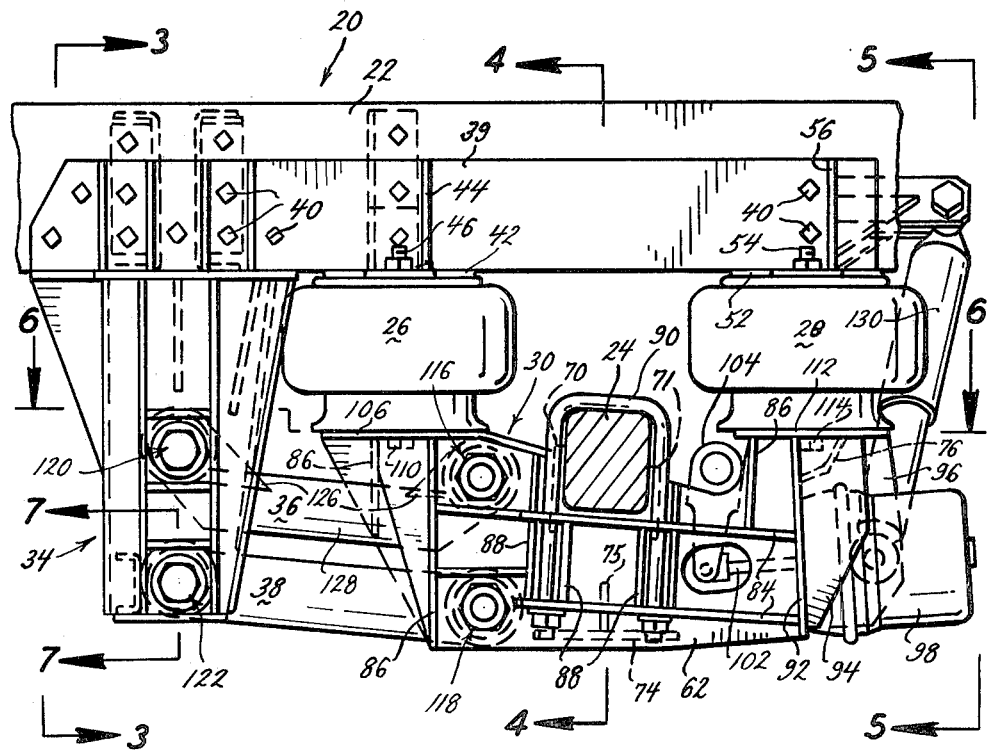
FIG. 2 is a side elevation view of the suspension assembly of FIG. 1.

Referring to the drawing, and particularly FIGS. 1 through 6, there is shown a suspension assembly 20 of this invention which is designed for installation between the chassis 22 of a vehicle and one of its drive axles 24. Although only a suspension assembly 20 for one side of the vehicle is shown, an identical suspension assembly would be located on the opposite side of the vehicle.

The suspension 20 generally includes a front air spring 26 and a rear air spring 28 depending from the chassis 22. An axle seat 30 is mounted between the lower floating ends of the air springs 26 and 28 with the axle 24 rigidly attached thereto. A hanger assembly 34 depends from the chassis 22 at a location forward of the air springs and axle seat and provides a mounting location for the forward ends of a pair of vertically spaced torque rods 36 and 38 which are pivotally connected between the hanger 34 and the forward end of the axle seat 30 to provide a parallelogram linkage between the chassis and axle to maintain the pitch of the axle and axle seat constant during up and down movement thereof upon loading and unloading the axle.

More specifically, the suspension assembly 20 is secured to the chassis 22 by a gusset plate 39 and a plurality of bolts 40. A top plate 42 for the front air spring 26 is secured to the gusset plate 39 and has a reinforcing web 44. Bolts 46 attach the front air spring 26 to the top plate 42. The rear air spring 28 is secured to a top plate 52 by bolts 54 with a reinforcing web 56 extending between the gusset plate 39 and top plate 52.

The lower ends of the air springs 26 and 28 are mounted to top portions of the axle seat 30 which includes two generally parallel plates 62 and 64 extending generally in the fore and aft direction. The plates 62 and 64 have aligned U-shaped notches 66 and 68 respectively for receipt of the axle 24 therein. Plates 70 and 71 are located fore and aft, respectively, of the axle between the parallel plates 62 and 64 and act along with other plates 74, 75 and 76 also located between the parallel plates 62 and 64 to hold these plates apart in spaced relation.

The axle seat 30 is also provided with horizontal reinforcing webs 84 and vertical reinforcing webs 86 to strengthen the axle seat. Further vertical plates 88 provide both structural support and guides for the receipt of U-bolts 90 which extend over the top of the axle 24 and through holes in the horizontal reinforcing webs 84 to firmly secure the axle to the axle seat.

A vertical back plate 92 covers and extends between the rearward ends of the parallel plates 62 and 64 below the air spring 28 with side plates 94 and 96 combining with the back plate 92 to define a compartment beneath the spring 28 for housing an air cylinder 98 of the vehicle. The brake cylinder 98 is mounted to the back plate 92 by suitable bolts (not shown) and has an actuating member 102 extending through the plate 92 for operation by a cam operating mechanism 104.

The axle seat 30 is raised at the forward and rearward ends and recessed therebetween to provide a mounting location for the axle 24 and cam operating mechanism 104. The portion of the axle seat 30 extending forwardly of the axle 24 has a top plate 106 to which the lower end of the forward air spring 26 is mounted by suitable bolts 110. The axle seat portion extending rearwardly of the axle 24 has a top plate 112 to which the lower end of the rearward air spring 28 is mounted by suitable bolts 114.

The axle seat 30 and axle 24 are given stability by their connection to the hanger 34 through the torque rods 36 and 38. It will be noted that the forward extension of the axle seat 30 from the axle has a substantial vertical dimension to provide a pocket between the parallel plates 62 and 64 forward of the axle for pivotally mounting the rearward ends of the rods 36 and 38 between the plates 62 and 64 by means of bushing assemblies 116 and 118, respectively. These bushing assemblies 116 and 118 may be of the type shown as item 108 in U.S. Pat. No. 3,801,086, the entirety of which is incorporated herein by reference. The forward ends of the torque rods 36 and 38 are pivotally mounted to the hanger 34 by means of eccentric bushing assemblies 120 and 122, respectively, each of which has a cam or eccentric bolt for axle alignment and adjustment of axle pitch and may be of the type shown as item 68 in U.S. Pat. No. 3,801,086. The hanger assembly 34 itself need not be described herein in detail and may be generally of the type disclosed in U.S. Pat. Nos. 3,801,086 and 3,912,294, the entirety of which are incorporated herein by reference.

The bushing assemblies 116 and 118 are located beneath and slightly rearwardly of the air spring 26 with the upper bushing 116 located very near the top of the forward extension of the axle seat where the lower end of the air spring 26 is mounted. It will also be noted that the upper torque rod 36 is offset downwardly from the center line between the pivot axes of the pivots 116 and 120 to provide clearance between the torque rod 36 and the top of the axle seat 30 upon up and down movement of the axle and axle seat. In this embodiment of the invention this offset is provided by plate members 126 at the forward and rearward ends of the rod 36 connected between the sleeves surrounding the bushings 116 and 120 and a generally straight portion 128 of the torque rod 36. A shock absorber 130 is mounted between a suitable bracket 132 secured to the chassis 22 and the side plate 96 at the rearward end of the axle seat 30 to provide dampening as is conventional in the art.

Operation

The operation of the assembly of this embodiment is evident from the foregoing description. As the load on the axle 24 varies, the axle and axle seat move up and down relative to the chassis with the air springs 26 and 28 resiliently resisting such movement and the parallelogram arrangement including the pivotally mounted torque rods 36 and 38 maintaining the pitch of the axle and axle seat constant upon such up and down movement. The entire assembly is self-contained or "unitary" in that all of the operational components including both of the torque rods 36 and 38 are contained within the assembly which is located at the end of the axle, yet compactness of design is maintained through the downward offset of the upper torque rod 36. Axle pitch and alignment is provided through adjustment of the eccentric bushings 120 and 122. Installation of the suspension assembly is easy and precise as all of the components are located at the side of the chassis, including the pivotal mountings for the torque rods 36 and 38, to insure proper alignment and positioning of the pivot mountings and thus proper operation of the parallelogram.

The Embodiment of FIG. 7

In FIG. 7 there is shown another embodiment of the invention. There are shown tandem suspensions 140 and 142 for supporting axles 144 and 146, respectively. The suspensions 140 and 142 are identical except that the suspension 140 extends forwardly from a hanger assembly 150 and the suspension assembly 142 extends rearwardly from the hanger assembly. It will be seen that the hanger assembly 150 is very similar to the hanger assembly 34 of the first described embodiment but is somewhat wider to accommodate the four eccentric bushings shown with this embodiment rather than the two shown with the first described embodiment. Each of the assemblies 140 and 142 is also essentially identical to the suspension assembly 20 of the first described embodiment except that the upper torque rods 160 are curved downwardly to provide the offset and clearance from the upper portion of the axle seat as previously discussed. The remaining components of this embodiment have been numbered the same as with the first embodiment due to their similarity in structure and operation.

The operation of each of the suspension assemblies 140 and 142 is essentially the same as that of the first embodiment with the exception of course that there are tandem axles instead of a single axle. While this embodiment has been shown with the upper torque rod 160 curved, the upper torque rod construction of the first described embodiment could also be used. Similarly, the curved upper torque arm 160 of this embodiment could also be used with the first described embodiment.

Figure 8:
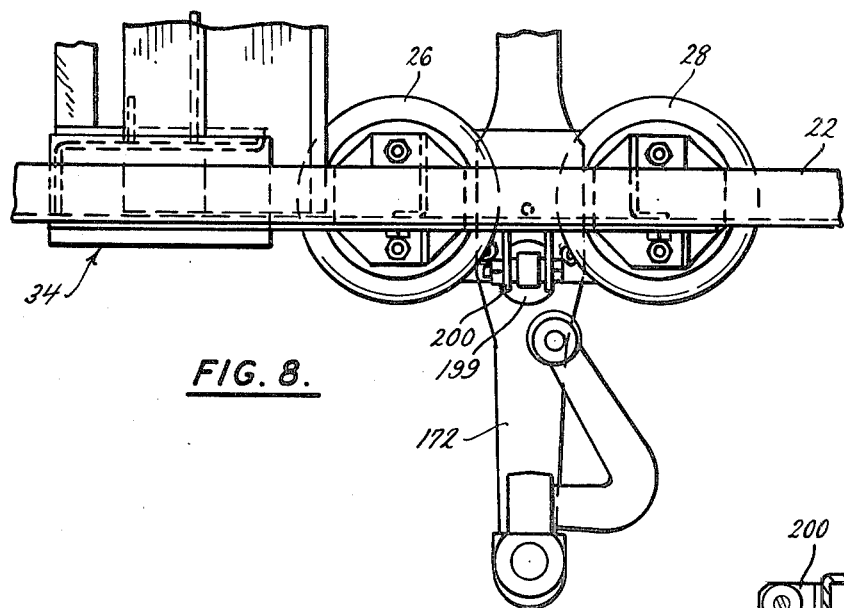
FIG. 8 is a plan view of another embodiment of this invention showing a suspension assembly of this invention for use with a steer axle.
Figure 10:
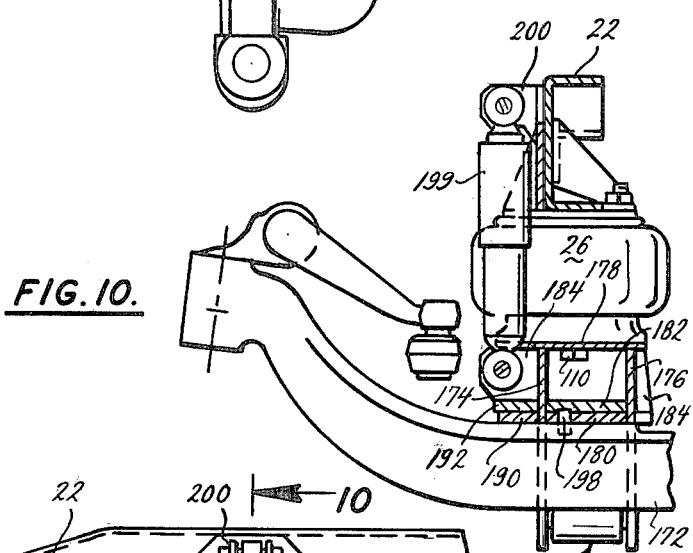
FIG. 10 is a view in section taken generally along the line 10—10 of FIG. 9
Figure 9:
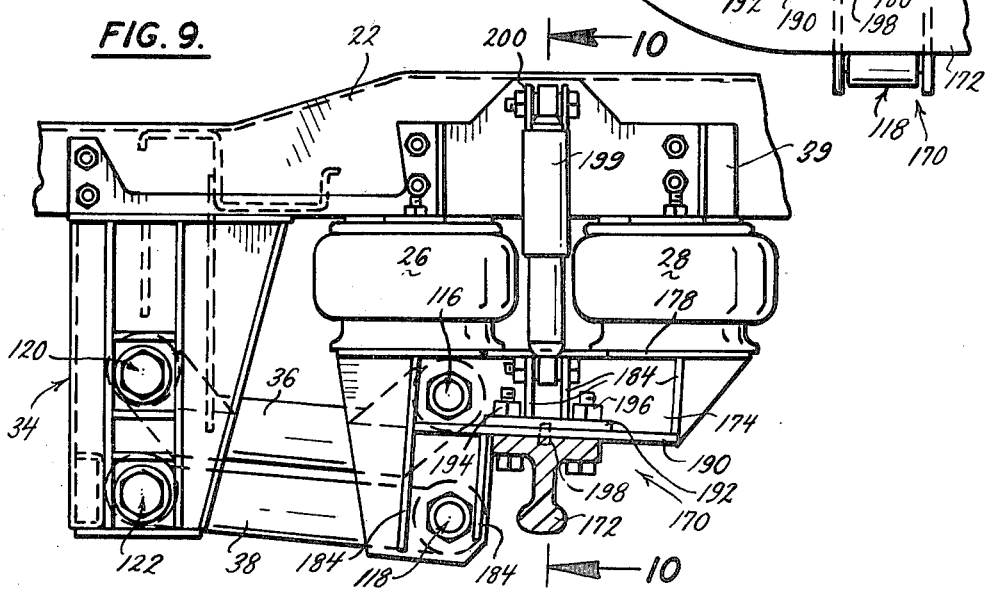
FIG. 9 is a side elevation view of the suspension assembly of FIG. 8.

The Embodiment of FIGS. 8 through 10

In FIGS. 8 through 10 there is shown a third embodiment of the invention for use with a steer axle. As can be seen from comparison of the figures of the drawings, many of the components of this embodiment are identical to that of the first, such as the hanger assembly, torque rods, bushing assemblies for mounting the torque rods, and the air springs. It will also be noted that the means for mounting the air springs to the chassis by use of a suitable gusset plate is also very similar to that of the first embodiment. Major differences between this embodiment and the first are in the structure of the axle seat in order to accommodate a steer axle rather than a drive axle.

Thus, there is shown an axle seat 170 with this embodiment of the invention to which is rigidly secured a steer axle 172. The axle seat 170 includes a pair of generally parallel side plates 174 and 176, each generally L-shaped as viewed in FIG. 9 with an upper portion that extends generally fore and aft above the axle and a vertical portion located forwardly of the axle. The parallel plates 174 and 176 are held in spaced apart relation by a top plate 178 and a bottom plate 180 extending between the parallel side plates. The axle seat is reinforced with generally horizontal reinforcing plates 182 and vertical reinforcing plates 184.

The axle 172 is mounted to the lower side of the plates 180 and 182 with upper backing plates 190 and 192, nut and bolt assemblies 194 and 196, and a locating pin 198.

The rearward ends of the torque rods 36 nd 38 are pivotally mounted by means of the bushing assemblies 116 and 118 to the forward portion of the axle seat defined by the forward vertical portions of the parallel L-shaped plates 174 and 176 in generally the same manner as with the first described embodiment. The lower ends of the air springs 26 and 28 are mounted to the top plate 178 of the axle seat by means of bolts 110 in generally the same manner as with the first described embodiment. A shock absorber 199 is located between the air springs and is mounted to the axle seat at its lower end by means of two of the vertical reinforcing members 184 located just above the axle, and is mounted at its upper end to the vehicle chassis by a bracket 200 secured to the gusset plate 39. The operation of the suspension assembly of this embodiment is generally the same as that of the first described embodiment.

Thus, there has been described a suspension assembly of the parallelogram, air spring type that is self-contained, or unitized, with all of the operating components of the suspension located as a single assembly at the end of the axle for easy and precise installation and increased stability and without sacrifice of compactness in design.

There are many changes and modifications which can be made to applicant's device which would be obvious to one of ordinary skill in the art, and which are included in the scope of applicant's invention. It is intended that applicant's invention be limited only by the scope of the claims appended hereto.

What is claimed is:

1. A suspension assembly for supporting a vehicle chassis on a vehicle axle comprising a hanger depending from the chassis and rigidly supported thereto to form a member thereof, an axle seat spaced longitudinally from the hanger, said vehicle axle being ridgidly mounted to the axle seat, the axle seat having a portion extending from the axle and toward the hanger and a portion extending from the axle and away from the hanger, air springs located on the same side of the hanger as the axle seat and mounted between the extended portions of the axle seat and chassis for resiliently resisting movement of the axle and axle seat during loading and unloading of the axle, and parallelogram means mounted between said chassis and said axle seat maintaining the pitch of the axle and axle seat constant during loading and unloading of the axle, said parallelogram means further comprising at least two rods each having one end pivotally mounted to said hanger, the portion of said axle seat extending toward the hanger defining a pocket for receipt of the other ends of said rods, said other ends of said rods being pivotally mounted within said pocket one above the other in spaced vertical relation.

2. The suspension assembly of claim 1 wherein the upper one of said rods is offset downwardly providing clearance from said axle seat.

3. The suspension assembly of claim 2 wherein said upper rod is curved downwardly to provide said offset and clearance.

4. The suspension assembly of claim 2 wherein said upper rod has a straight portion extending generally fore and aft and a member pivotally mounted to said axle seat and depending downwardly to said straight portion to provide said offset and clearance.

5. The suspension assembly of claim 1 wherein the portion of said axle seat extending from the axle and away from the hanger defines a compartment for housing an air brake cylinder for the vehicle.

6. A suspension assembly for supporting a vehicle chassis on a vehicle axle comprising a hanger depending from said chassis and rigidly supported thereto to form a member thereof, an axle seat spaced longitudinally from the hanger, the vehicle axle being ridgidly mounted to the axle seat, said axle seat having a portion extending from the axle and toward the hanger and a portion extending from the axle and away from the hanger, air spring means mounted between the extending portions of the axle seat and the chassis, said air spring means being located on the same side of the hanger as the axle seat, and parallelogram means mounted between said chassis and said axle seat maintaining the pitch of the axle and axle seat constant during loading and unloading of the axle, said parallelogram means further comprising at least two parallel rods of approximately the same length, one located above the other and each having one end pivotally mounted to said hanger and its other end pivotally mounted to the portion of said axle seat extending toward the hanger.

7. The suspension assembly of claim 6 wherein the portion of said axle seat extending toward the hanger defines a pocket within which said other ends of the rods are pivotally mounted.

8. The suspension assembly of claim 7 wherein the portion of said axle seat extending away from the hanger defines a compartment for housing an air brake cylinder for the vehicle.

9. The suspension assembly of claim 7 wherein the upper one of said rods is offset downwardly providing clearance from the axle seat.

10. The suspension assembly of claim 9 wherein the upper rod is curved downwardly to provide said offset and clearance.

11. The suspension assembly of claim 9 wherein the upper rod has a straight portion extending generally fore and aft and members pivotally mounted to said axle seat and hanger and depending downwardly therefrom to said straight portion to provide said offset and clearance.

12. The suspension assembly of claim 9 wherein the pivotal mount at said other end of the upper rod is located beneath an air spring.

13. The suspension assembly of claim 6 wherein the pivotal mount of at least one end of each rod is eccentric providing adjustment for axle alignment.

14. The suspension assembly of claim 6 wherein the upper one of said rods is offset downwardly providing clearance from the axle seat.

15. A suspension assembly for supporting a vehicle chassis on a vehicle axle comprising a hanger depending from said chassis and rigidly supported thereto to form a member thereof, an axle seat spaced longitudinally from the hanger, the vehicle axle being rigidly mounted to the axle seat, spring means mounted between the axle seat and chassis for resiliently resisting movement of the axle and axle seat during loading and unloading of the axle, and parallelogram means mounted between said chassis and said axle seat maintaining the pitch of the axle and axle seat constant during loading and unloading of the axle, said parallelogram means further comprising at least two rods, one located above the other and each having one end pivotally mounted to said hanger and its other end pivotally mounted to said axle seat, the upper one of said rods being off-set downwardly providing clearance from the axle seat.

16. The suspension assembly of claim 15 wherein the axle seat has a portion extending from the axle and toward the hanger defining a pocket for receipt of the other ends of said rods, said other ends of said rods being pivotally mounted within said pocket one above the other in spaced vertical relation.

* * * * *